United States Patent
Le-Khac et al.

(10) Patent No.: US 6,884,826 B2
(45) Date of Patent: Apr. 26, 2005

(54) PROCESS FOR PREPARING DOUBLE METAL CYANIDE CATALYZED POLYOLS

(75) Inventors: Bi Le-Khac, Westchester, PA (US); Todd D. Gentile, Douglassville, PA (US)

(73) Assignee: Bayer Antwerp, N.V., Antwerp (BE)

( * ) Notice: Subject to any disclaimer, the term of this patent is extended or adjusted under 35 U.S.C. 154(b) by 0 days.

(21) Appl. No.: 10/457,264

(22) Filed: Jun. 9, 2003

(65) Prior Publication Data

US 2004/0249104 A1 Dec. 9, 2004

(51) Int. Cl.[7] .............................................. C08G 18/48
(52) U.S. Cl. ...................... 521/174; 568/620; 568/624; 528/412; 528/415; 528/421
(58) Field of Search ................. 568/620, 624; 528/412, 415, 421; 521/174

(56) References Cited

U.S. PATENT DOCUMENTS

| 3,404,109 A | 10/1968 | Milgrom ...................... 260/611 |
| 3,427,255 A | 2/1969 | Milgrom ...................... 252/431 |
| 3,427,334 A | 2/1969 | Belner ......................... 260/429 |
| 3,427,335 A | 2/1969 | Herold ......................... 260/429 |
| 3,715,402 A | 2/1973 | Louvar et al ............ 260/613 B |
| 3,823,145 A | 7/1974 | Louvar et al .......... 260/268 PL |
| 3,829,505 A | 8/1974 | Herold .................... 260/611 B |
| 3,941,849 A | 3/1976 | Herold .................... 260/607 A |
| 4,355,188 A | 10/1982 | Herold et al. ................ 568/620 |
| 4,472,560 A | 9/1984 | Kuyper et al. ............... 526/120 |
| 4,477,589 A | 10/1984 | van der Hulst et al. .... 502/169 |
| 4,721,818 A | 1/1988 | Harper et al. ................ 568/120 |
| 5,158,922 A | 10/1992 | Hinney et al. .............. 502/175 |
| 5,470,813 A | 11/1995 | Le-Khac ...................... 502/175 |
| 5,482,908 A | 1/1996 | Le-Khac ...................... 502/156 |
| 5,536,883 A | 7/1996 | Le-Khac ...................... 568/620 |
| 5,545,601 A | 8/1996 | Le-Khac ...................... 502/156 |
| 5,563,221 A | 10/1996 | Pazos ........................ 525/409 |
| 5,627,120 A | 5/1997 | Le-Khac ...................... 502/156 |
| 5,637,673 A | 6/1997 | Le-Khac ...................... 528/405 |
| 5,712,216 A | 1/1998 | Le-Khac et al. ............ 502/175 |
| 5,789,626 A | 8/1998 | Le-Khac ...................... 568/620 |
| 5,990,232 A | 11/1999 | Shen et al. .................. 524/762 |
| 6,018,017 A | 1/2000 | Le-Khac ...................... 528/421 |
| 6,083,420 A * | 7/2000 | Lear et al. ............. 252/182.24 |
| 6,391,820 B1 | 5/2002 | Ooms et al. ................. 502/175 |
| 2003/0100801 A1 | 5/2003 | Toyota et al ................ 568/679 |
| 2004/0073069 A1 | 4/2004 | Heider et al. ............... 568/672 |

FOREIGN PATENT DOCUMENTS

| DE | 198 40 846 A1 | 3/2000 |
| EP | 589 635 A1 | 3/1994 |
| EP | 750 001 A2 | 12/1996 |
| JP | 4-145123 | 5/1992 |
| WO | WO 93/24594 | 12/1993 |
| WO | WO 01/04183 A1 | 1/2001 |
| WO | WO 03/091190 A1 | 11/2003 |
| WO | WO 03/091191 A1 | 11/2003 |

* cited by examiner

*Primary Examiner*—Rachel Gorr
(74) *Attorney, Agent, or Firm*—Joseph C. Gil; John E. Mrozinski, Jr.

(57) ABSTRACT

The present invention provides a process for preparing a polyoxyalkylene polyol by polyoxyalklating a starter compound with a mixture of two different alkylene oxide monomers in which the first alkylene oxide monomer content of the mixture decreases as the content of the second alkylene oxide monomer increases over the course of the polyoxyalkylation, digesting unreacted monomers of the alkylene oxides and capping the polyol.

26 Claims, 3 Drawing Sheets

PROCESS FOR PREPARING DOUBLE METAL CYANIDE CATALYZED POLYOLS

FIELD OF THE INVENTION

The present invention relates in general to polyols and more specifically to an improved, double metal cyanide (DMC) catalyzed process for preparing a polyoxyalkylene polyol. The polyols produced by the inventive process have a relatively high content of primary hydroxyl groups.

BACKGROUND OF THE INVENTION

Polyoxyalkylene polyether polyols have a number of uses, including, for example, their use in providing the "soft segments" of polyurethane, polyurethane/urea, and in some cases, polyester polymers. Although polyoxyethylene polyols are useful in certain applications, their higher degree of crystallinity, hydrophilicity, and hygroscopicity, restrict their use in many applications where their higher carbon content homologs, predominately polyoxypropylene and polyoxybutylene polyols, have proven satisfactory. The latter polyols, in all but the lowest molecular weight oligomers, are relatively hydrophobic, and are thus compatible with many reactive polymer systems.

Oxyalkylation of suitably hydric initiator molecules with propylene oxide, butylene oxide, and other higher alkylene oxides, results in polyoxy(higher)alkylene polyols whose terminal hydroxyl groups are largely secondary hydroxyls. Secondary hydroxyl groups are not nearly as reactive as primary hydroxyls. Because of the lower reactivity of the secondary hydroxyl group, the use of homopolymeric polyoxypropylene and polyoxybutylene polyols is rendered difficult, if not impossible, in such high volume products as high resilience (HR) polyurethane slab foam and one shot molded polyurethane foam. In less critical applications such as polyurethane elastomers and prepolymer derived foams, where high secondary hydroxyl polyols may be used in the form of prepolymers to prepare acceptable products, prepolymer processing time is extended, thereby creating an economic penalty at the raw material end rather than at the product end. Therefore, poly(higher)oxyalkylene polyols are frequently capped with polyoxyethylene groups to provide high primary hydroxyl content.

As an example, a 4200 Dalton (Da) molecular weight polyoxypropylene triol prepared by the strong base (KOH) catalyzed polyoxypropylation of glycerine may be "EO-capped" ("ethylene oxide capped") by conducting the last portion of the oxyalkylation with ethylene oxide rather than propylene oxide. Adding enough ethylene oxide to produce a 6000 Da triol (30% EO cap) will introduce polyoxyethylene terminated molecules having substantially higher primary as compared to secondary, hydroxyl content. Unfortunately, this procedure has several drawbacks. First, because ethylene oxide is polymerized onto the molecules in random fashion, a considerable quantity of cap must be present to produce a high primary hydroxyl content. For example, a 30 wt. % ethylene oxide (EO) cap generally results in only approximately 70–80% primary hydroxyl content. Second, the large amount of polyoxyethylene content considerably alters important properties such as hydrophobicity and hygroscopicity, and may confer often unwanted surfactant properties by establishing or altering hydrophile/lipophile balance.

Low mono polyols are generally prepared by double metal cyanide complex catalyzed polyoxyalkylation. During conventional base-catalyzed oxypropylation, a competing rearrangement of propylene oxide into allyl alcohol continually generates an oxyalkylatable unsaturated mono during the course of the reaction. The polyoxyalkylation of this monomeric species produces oligomeric monols of broad molecular weight range, which not only increase polydispersity, but more importantly, decreases the product functionality. For example, polyoxypropylene triols with equivalent weights of 2000 Da may contain 40 mol percent monol, thus lowering the theoretical, or "nominal" functionality from 3.0 to the range of 2.1 to 2.3.

Double metal cyanide (DMC) complex catalysts such as non-stoichiometric zinc hexacyanocobaltate glyme complexes are able to produce polyoxypropylene polyols with low monol content, as reflected by levels of unsaturation of 0.015 to 0.020 meq/g polyol, compared to unsaturation of 0.06 meq/g to 0.012 meq/g in moderate to high molecular weight, conventionally base-catalyzed polyols. Improvements in DMC catalysts, described in U.S. Pat. Nos. 5,470,813 and 5,482,908, permit production of "ultra-low" unsaturation polyols, with unsaturation in the range of 0.003 meq/g or lower, to about 0.010 meq/g. The monol content of polyols produced by these catalysts is exceptionally low, in the worst cases about 2 mol percent, and often virtually unmeasurable. Moreover, the polydispersity of these polyols is exceptionally low. The polyols, in many cases, are essentially monodisperse.

Ethylene oxide (EO) capping of DMC catalyzed polyoxy(higher)alkylene polyols may be accomplished by purifying the polyol to remove the DMC catalyst, followed by addition of another oxyalkylation catalyst. Another technique is to denature the DMC catalyst by adding an excess of strong alkali metal base, the excess serving as the polyoxyethylation catalyst. However, these methods require adsorption, neutralization, and/or filtration of the generally rather viscous polyol product to remove basic catalyst residues, increasing cost of the product. Moreover, the polyoxyethylene capping ("EO capping") suffers from the same drawbacks as the ethylene oxide (EO) capping of conventional, base-catalyzed polyols: the capping is both inefficient and further alters the physical characteristics of the polyol. It is especially difficult to prepare high primary hydroxyl polyoxy(higher)alkylene polyols with low molecular weights without grossly altering polyol properties.

Therefore, a need exists in the art for a DMC-catalyzed process for producing polyoxyalkylene polyols having a relatively high primary hydroxyl content without significantly altering other polyol properties. It is furthermore desirable to develop a process for directly preparing such DMC-catalyzed polyols requiring a greatly reduced amount of capping than is presently needed.

SUMMARY OF THE INVENTION

The present invention provides a process for preparing a polyoxyalkylene polyol by polyoxyalkylating a starter compound with a mixture of two different alkylene oxides in which the first alkylene oxide monomer content of the mixture decreases as the content of the second alkylene oxide monomer increases over the course of the polyoxyalkylation, digesting unreacted monomers of the alkylene oxides and capping the polyol.

The polyoxyalkylene polyols prepared by the process of the present invention may be used to produce polyurethane coatings, elastomers, sealants, foams, adhesives and the like.

These and other advantages and benefits of the present invention will be apparent from the Detailed Description of the Invention herein below.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
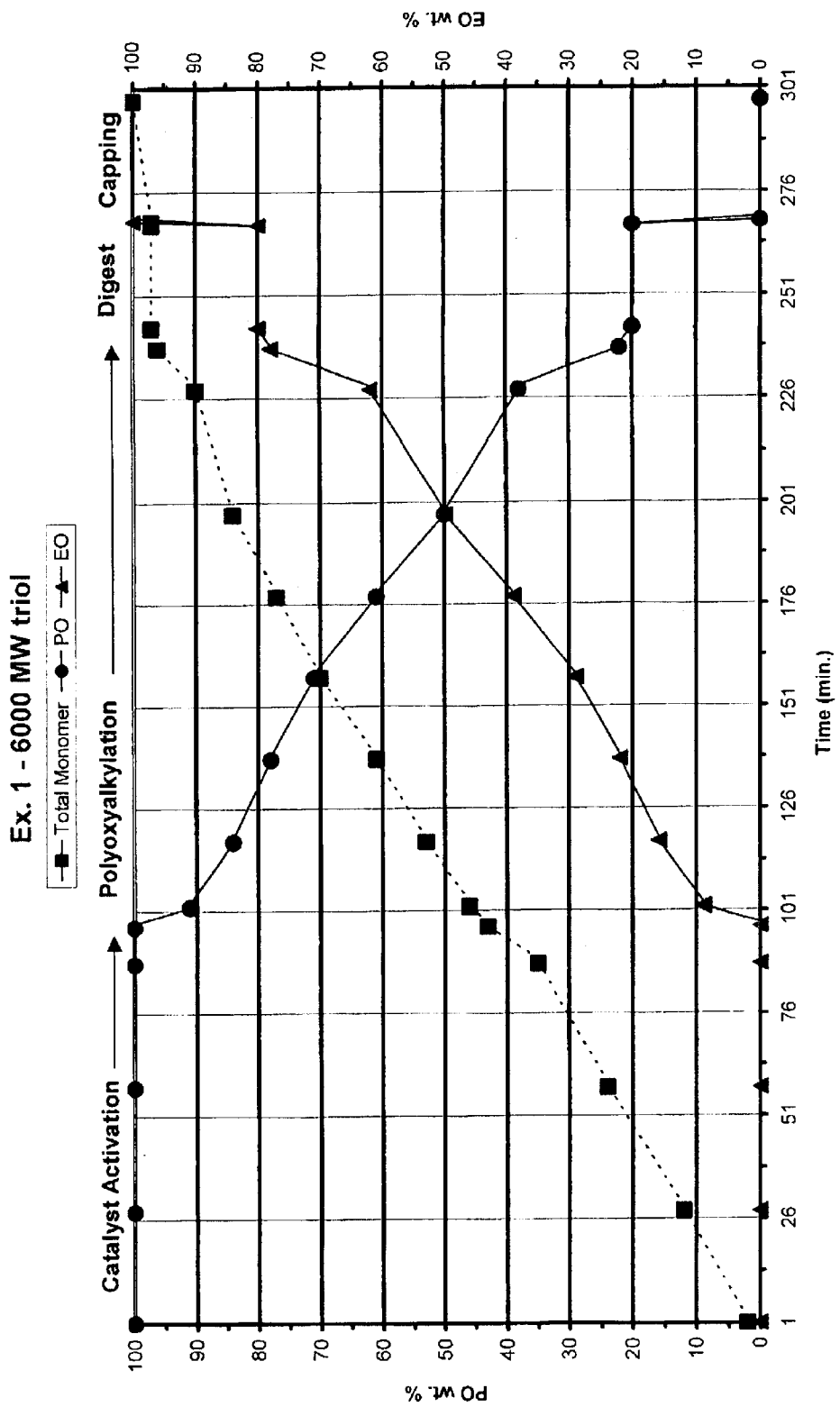
FIG. 1 shows the composition of the feed stream during the production of a 6000 MW trio according to the process of Example 1 of the present invention.

Except in the operating examples, or where otherwise indicated, all numbers expressing quantities, percentages, OH numbers, functionalities and so forth in the specification are to be understood as being modified in all instances by the term "about."

The present invention provides a process for preparing a polyoxyalkylene polyol involving combining a starter compound having active hydrogen atoms with a double metal cyanide (DMC) catalyst, activating the double metal cyanide (DMC) catalyst with a first alkylene oxide monomer ($AO^1$), polyoxyalkylating the starter compound with a mixture of the first alkylene oxide monomer ($AO^1$) and a second alkylene oxide monomer ($AOIAO^2$) in which the first alkylene oxide monomer ($AO^2$) content of the mixture decreases as content of the second alkylene oxide monomer ($AO^2$) increases over the course of the polyoxyalkylation such that $AO^1+AO^2=100\%$, digesting unreacted monomers of the first alkylene oxide ($AO^1$) and the second alkylene oxide ($AO^2$) and capping the polyol by adding the second alkylene oxide monomer ($AO^2$) thereto, wherein the first alkylene oxide ($AO^1$) monomer and the second alkylene oxide ($AO^2$) monomer are different.

The process of the present invention may employ any double metal cyanide (DMC) catalyst. Suitable double metal cyanide (DMC) catalysts are well known to those skilled in the art. Double metal cyanide complex (DMC) catalysts are non-stoichiometric complexes of a low molecular weight organic complexing agent and optionally other complexing agents with a double metal cyanide salt, e.g. zinc hexacyanocobaltate. Exemplary double metal cyanide (DMC) complex catalysts include those suitable for preparation of low unsaturation polyoxyalkylene polyether polyols, such as disclosed in U.S. Pat. Nos. 3,427,256; 3,427,334; 3,427,335; 3,829,505; 4,472,560; 4,477,589; and 5,158,922. The double metal cyanide (DMC) catalysts more preferred in the process of the present invention are those capable of preparing "ultra-low" unsaturation polyether polyols. Such catalysts are disclosed in U.S. Pat. Nos. 5,470,813 and 5,482,908, and 5,545,601, the entire contents of which are herein incorporated by reference. Most preferred in the process of the present invention are those zinc hexacyanocobaltate catalysts prepared by the methods of the patents incorporated hereinabove.

The catalyst concentration is chosen so as to ensure a good control of the polyoxyalkylation reaction under the given reaction conditions. The catalyst concentration is preferably in the range from 0.0005 wt. % to 1 wt. %, more preferably in the range from 0.001 wt. % to 0.1 wt. %, most preferably in the range from 0.001 to 0.0025 wt. %, based on the amount of polyether polyol to be produced.

As those skilled in the art are aware, an organic complexing ligand may be included with the DMC catalyst. Any organic complexing ligand may preferably be part of the DMC catalyst in the process of the present invention, such as the organic complexing ligands described in U.S. Pat. Nos. 3,404,109, 3,829,505, 3,941,849, 5,158,922 and 5,470,813, as well as in EP 700 949, EP 761 708, EP 743 093, WO 97/40086 and JP 4145123. Such organic complexing ligands include water-soluble organic compounds with heteroatoms, such as oxygen, nitrogen, phosphorus or sulfur, which can form complexes with the DMC compound. Preferred as organic complexing ligands, are alcohols, aldehydes, ketones, ethers, esters, amides, ureas, nitriles, sulfides and mixtures thereof. More preferred organic complexing ligands include water-soluble aliphatic alcohols, such as, for example, ethanol, isopropanol, n-butanol, iso-butanol, secbutanol and tert-butanol. Tert-butanol is most preferred.

The DMC catalysts in the process of the present invention may optionally contain at least one functionalized polymer. "Functionalized polymer" is defined herein as a polymer or its salt that contains one or more functional groups including oxygen, nitrogen, sulfur, phosphorus or halogen. Examples of functionalized polymers preferred in the process of the present invention include, but are not limited to, polyethers; polyesters; polycarbonates; polyalkylene glycol sorbitan esters; polyalkylene glycol glycidyl ethers, polyacrylamides; poly(acrylamide-co-acrylic acids), polyacrylic acids, poly(acrylic acid-co-maleic acids), poly(N-vinylpyrrolidone-co-acrylic acids), poly(acrylic acid-co-styrenes) and the salts thereof; maleic acids, styrenes and maleic anhydridecopolymers and the salts thereof; block copolymers composed of branched chain ethoxylated alcohols; alkoxylated alcohols such as NEODOL (sold commercially by Shell Chemical Company); polyether; polyacrylonitriles; polyalkyl acrylates; polyalkyl methacrylates; polyvinyl methyl ethers; polyvinyl ethyl ethers; polyvinyl acetates; poiyvinyl alcohols; poly-N-vinylpyrrolidones; polyvinyl methyl ketones; poly(4-vinylphenols); oxazoline polymers; polyalkyleneimines; hydroxyethylcelluloses; polyacetals; glycidyl ethers; glycosides; carboxylic acid esters of polyhydric alcohols; bile acids and their salts, esters or amides; cyclodextrins; phosphorus compounds; unsaturated carboxylic acid esters; and ionic surface- or interface-active compounds. Polyether polyols are most preferably be used in the process of the present invention.

Where used, functionalized polymers may be present in the DMC catalyst in an amount of from 2 to 80 wt. %, preferably, from 5 to 70 wt. %, more preferably, from 10 to 60 wt. %, based on the total weight of DMC catalyst. The functionalized polymers may be present in the DMC catalyst in an amount ranging between any combination of these values, inclusive of the recited values.

The starter compound in the process of the present invention may preferably be any compound that has active hydrogen atoms. Starter compounds preferred in the process of the present invention include compounds having number average molecular weights between 18 to 2,000, more preferably, between 32 to 2,000, and having from 1 to 8 hydroxyl groups. Preferred starter compounds include, but are not limited to, polyoxypropylene polyols, polyoxyethylene polyols, polytetatramethylene ether glycols, glycerol, propoxylated glycerols, tripropylene glycol, alkoxylated allylic alcohols, bisphenol A, pentaerythritol, sorbitol, sucrose, degraded starch, water and mixtures thereof.

Monomers or polymers that will copolymerize with an oxide in the presence of a DMC catalyst may also be included in the process of the present invention to produce various types of polyols.

The polyoxyalkylation mixture has two different alkylene oxide monomers (a first and second alkylene oxide ($AO^1/AO^2$)) in amounts that vary over the course of the polyoxyalkylation reaction. The addition of this mixture is "ramped" so that the overall alkylene oxide (total monomer) content gradually increases over the course of the polyoxyalkylation as illustrated by the dashed line in FIGS. 1–3. Also, the contents of the individual monomers in the mixture are related, by the expression:

$$AO^1 + AO^2 = 100\%$$

such that during the polyoxyalkylation, the first alkylene oxide monomer ($AO^1$) content decreases as the second alkylene oxide monomer ($AO^2$) content increases. Both the increase and decrease in monomer contents occur in a substantially smooth, linear manner, as shown by the solid lines in FIGS. 1–3.

Upon completion of the addition of the mixture of different alkylene oxide monomers, the reaction mixture may preferably be held at the reaction temperature for 30 minutes to one hour, the digest time, and then may be stripped preferably for 1.5 to 2.5 hours at 800 to 130° C. at less than 5 mm Hg to yield the polyoxyalkylene polyol.

Preferred alkylene oxide monomers include, but are not limited to, ethylene oxide, propylene oxide, butylene oxide, etc. The feed stream ($AO^1/AO^2$) content of the first alkylene oxide monomer ($AO^1$) preferably decreases to 20 wt. % as the second alkylene oxide monomer ($AO^2$) content increases to 80 wt. % of the feed stream over the course of the polyoxyalkylation. The first and second alkylene oxide monomers may be present in the mixture in an amount ranging between any combination of these values, inclusive of the recited values provided that the first alkylene oxide monomer ($AO^1$) and the second alkylene oxide monomer ($AO^2$) total 100 wt % of the mixture.

The polyoxyalkylation of starter compounds containing active hydrogen atoms in the process of the present invention may preferably be carried out at temperatures of 20° to 200°, more preferably in the range from 400 to 180° C., most preferably at temperatures of 50° to 150° C. The reaction may preferably be carried out at total pressures of 0.001 to 20 bar. The polyoxyalkylation may be carried out in bulk or in an inert organic solvent such as toluene and/or THF. The amount of solvent is preferably 10 to 30 wt. %, based on the amount of polyoxyalkylene polyol to be produced. Suitable methods for capping polyols are known in the art and described in, for example, U.S. Pat. Nos. 3,715,402; 3,823,145; 4,721,818; 4,355,188 and 5,563,221. The polyols made by the process of the present invention advantageously require a much lower amount of capping than has heretofore been necessary. Preferably, the capping adds 1–5 wt. %, more preferably 1–3 wt. % of the second alkylene oxide ($AO^2$) to the polyol.

Polyoxyalkylene polyols produced by the processes of the invention will preferably have a high content of primary hydroxyl groups, i.e., from 40% to 80%, more preferably, from 60% to 80%. The polyols produced by the processes of the invention are useful for producing polyurethane foams, elastomers, sealants, coatings and adhesives. Additionally, the polyoxyalkylene polyols produced by the processes of the invention will preferably have lower unsaturation levels than polyols produced using only basic (KOH) catalysts.

The following examples are merely illustrative of the present invention. Those skilled in the art will recognize many variations, which are within the spirit of the invention and scope of the claims.

EXAMPLES

Example 1

Preparation of 6000 MW EO/PO (20/80 wt. Ratio) Triol which Contains High Primary Hydroxyl Functionality A 1.5-liter reactor was charged with a propoxylated glycerin starter (hydroxyl number=240 mg KOH/g) starter (130.4 g), DMC catalyst prepared essentially by the method of U.S. Pat. No. 5,482,908 (0.0521 g, 50 ppm. based on the amount of finished polyol product). The mixture was stirred at 400 rpm and stripped under vacuum for 30 minutes at 130° C. to remove trace of water. After stripping, the reactor mixture was stirred at 700 rpm and heated at 130° C. Propylene oxide (19.5 g) was fed to the reactor to activate catalyst. Additional monomer mixture was not added until an accelerated pressure drop occurred in the reactor. That pressure drop is evidence that the catalyst has become activated. When the catalyst activation was verified, propylene oxide (678 g) and ethylene oxide (208 g) were added gradually over about 5 hours to control the profile of PO/EO composition in the polyol product as shown in Table I. After monomer addition was completed, the reactor mixture was held at 130° C. for 25 minutes hour. Residual unreacted monomer was stripped under vacuum at 80° C. for 45 minutes from the polyol product. FIG. 1 shows the composition of the feed stream mixture during the process of Example 1.

TABLE I

| 6k triol, 20/80 EO/PO, no solvent | | | |
|---|---|---|---|
| Time | Total Monomer (PO + EO) Feed | Feed Composition | |
| (min.) | (wt. %) | PO % | EO % |
| 10 | 2 | 100 | 0 |
| 37 | 12 | 100 | 0 |
| 67 | 24 | 100 | 0 |
| 97 | 35 | 100 | 0 |
| 106 | 43 | 100 | 0 |
| 111 | 46 | 91 | 9 |
| 127 | 53 | 84 | 16 |
| 147 | 61 | 78 | 22 |
| 167 | 70 | 71 | 29 |
| 187 | 77 | 61 | 39 |
| 207 | 84 | 50 | 50 |
| 237 | 90 | 38 | 62 |
| 247 | 96 | 22 | 78 |
| 252 | 97 | 20 | 80 |
| 25 min digestion | | | |
| 277 | 97 | 20 | 80 |
| 3 wt. % EO capping | | | |
| 278 | 97 | 0 | 100 |
| 307 | 100 | 0 | 100 |

Example 2

Figure 2:
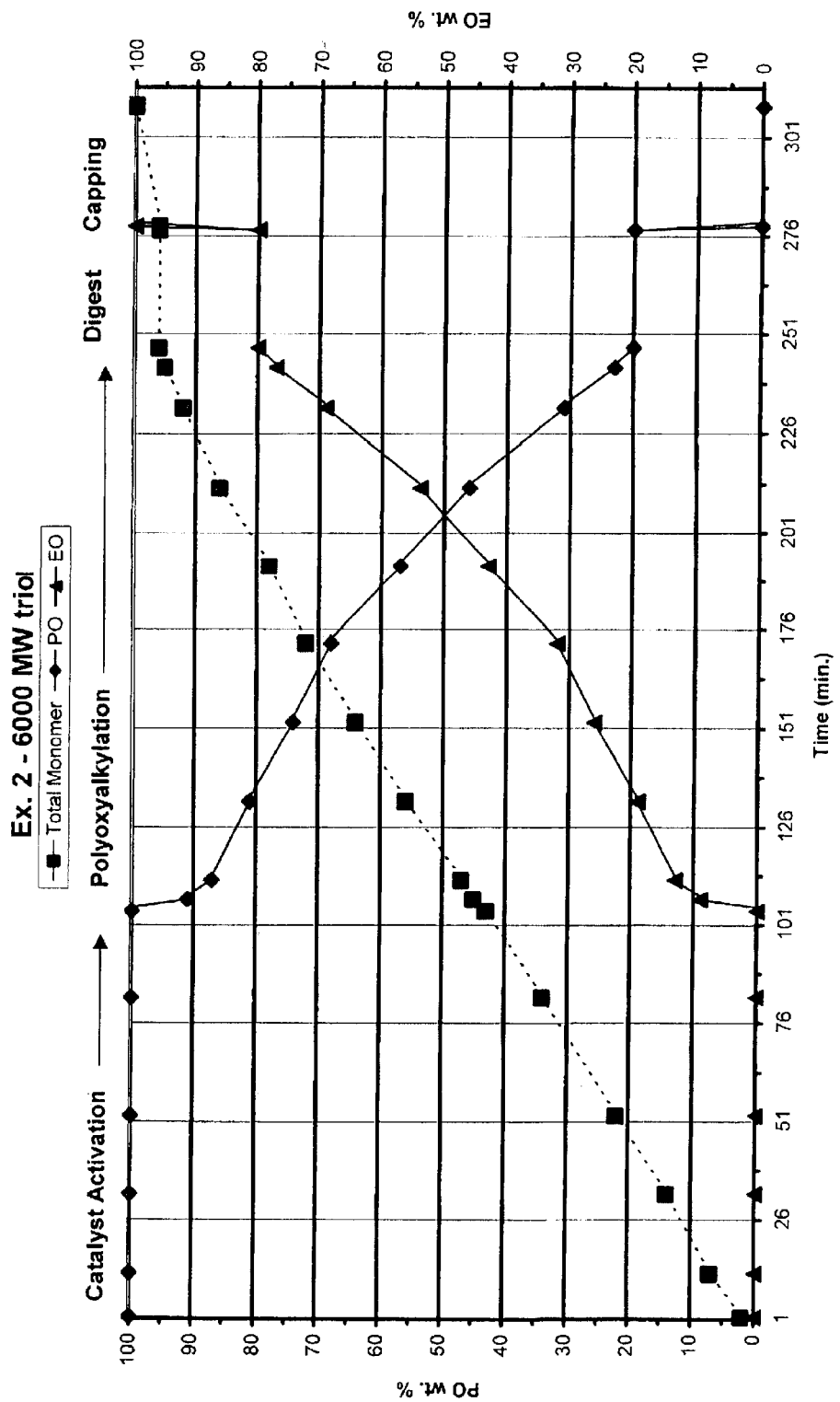
FIG. 2 illustrates the composition of the feed stream during the production of a 6000 MW triol according to the process of Example 2 of the present invention.

Preparation of 6000 MW EO/PO (20/80 wt. Ratio) Triol which Contains High Primary Hydroxyl Functionality The procedure of Example 1 was followed, except that a DMC catalyst containing NACl prepared essentially by the method of co-pending U.S. patent application Ser. No. 10/251,155, the entire contents of which are herein reference, was used with a digest time of 30 minutes. The profile of feed composition is shown in Table II. FIG. 2 illustrates the of the feed stream mixture during the process of Example 2.

TABLE II 6k triol, 20/80 EO/PO, no solvent

| Time | Total Monomer (PO + EO) Feed | Feed Composition | |
|---|---|---|---|
| (min.) | (wt. %) | PO % | EO % |
| 9 | 2 | 100 | 0 |
| 20 | 7 | 100 | 0 |
| 40 | 14 | 100 | 0 |
| 60 | 22 | 100 | 0 |
| 90 | 34 | 100 | 0 |
| 112 | 43 | 100 | 0 |
| 115 | 45 | 91 | 9 |
| 120 | 47 | 67 | 13 |
| 140 | 56 | 81 | 19 |
| 160 | 64 | 74 | 26 |
| 180 | 72 | 66 | 32 |
| 200 | 78 | 57 | 43 |
| 220 | 86 | 46 | 54 |
| 240 | 92 | 31 | 69 |
| 250 | 95 | 23 | 77 |
| 255 | 96 | 20 | 80 |
| 30 min digestion | | | |
| 285 | 96 | 20 | 80 |
| 3.1% EO capping | | | |
| 286 | 96 | 0 | 100 |
| 316 | 100 | 0 | 100 |

Example 3

Figure 3:
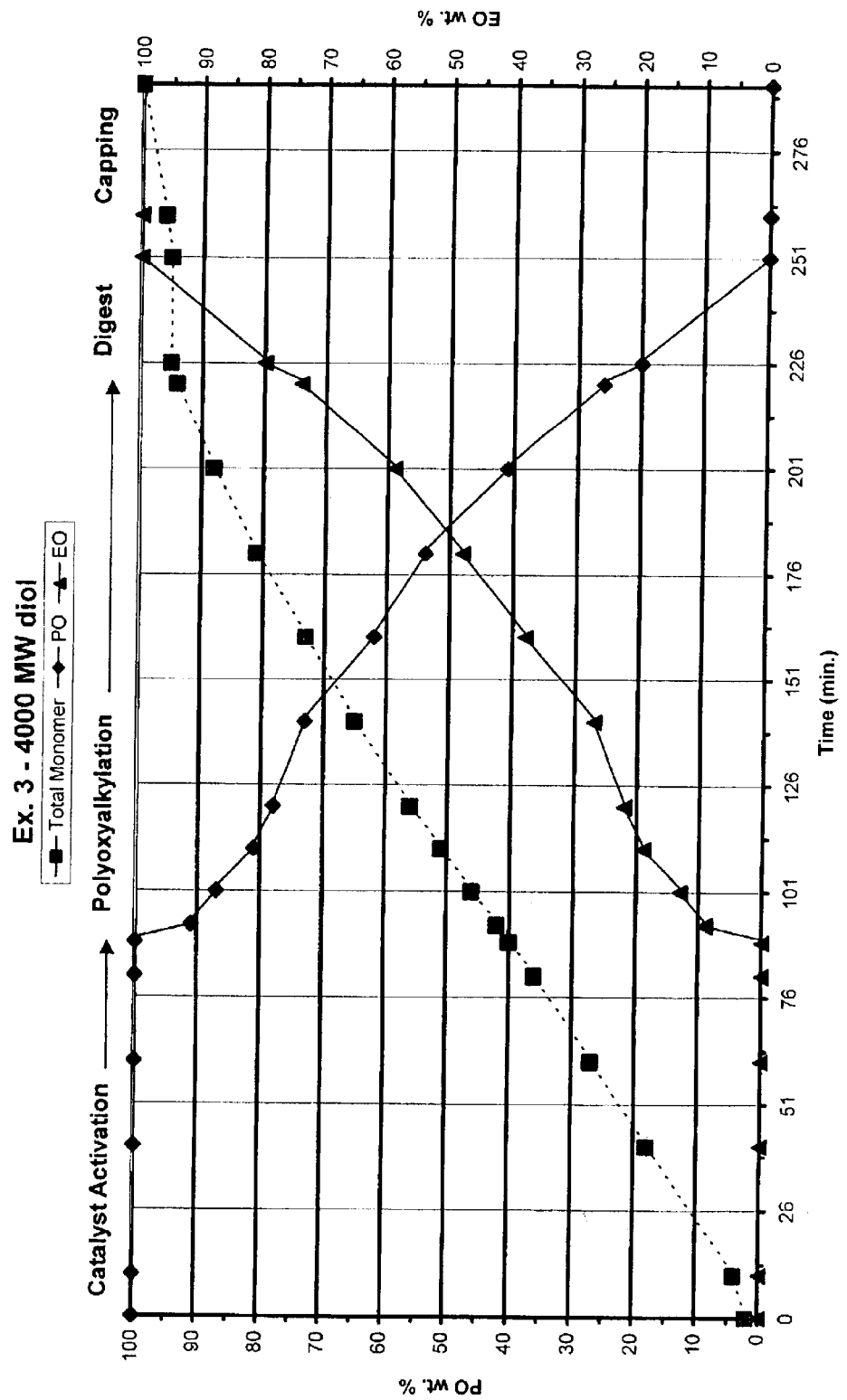
FIG. 3 depicts the composition of the feed stream during the production of a 4000 MW diol according to the process of Example 3 of the present invention.

Preparation of 4000 MW EO/PO (20/80 wt. Ratio) Diol which Contains High Primary Hydroxyl Functionality A 1.5-liter reactor was charged with a propoxylated propylene glycol starter (hydroxyl number=154.8 mg KOH/g) diol starter (204.6 g), DMC catalyst containing NaCl and NEODOL-(EO)$_m$-IBO prepared essentially by the method of co-pending U.S. patent application Ser. No. 10/251,155 (0.0522 g, 50 ppm. based on the amount of finished polyol product). The mixture was stirred at 400 rpm and stripped under vacuum for 30 minutes at 130° C. to remove trace of water. After stripping, the reactor mixture was stirred at 700 rpm and heated at 130° C. Propylene oxide (16.5 g) was fed to the reactor to activate catalyst. Additional monomer mixture was not added until an accelerated pressure drop occurs in the reactor. As stated above, that pressure drop is evidence that the catalyst has become activated. When the catalyst activation was verified, propylene oxide (614.5 g) and ethylene oxide (208 g mixed with 15.5 g acetonitrile) were added gradually over about 4 hours to control the profile of PO/EO composition in the polyol product as shown in Table III. After monomer addition was completed, the reactor mixture was held at 130° C. for 30 minutes. Residual unreacted monomer and acetonitrile were then stripped under vacuum at 80° C. for 30 minutes from the polyol product. FIG. 3 depicts the composition of the feed stream mixture during the process of Example 3.

TABLE III 4k diol, 20/80 EO/PO, acetonitrile additive

| Time | Total Monomer (PO + EO) Feed | Feed Composition | |
|---|---|---|---|
| (min.) | (wt. %) | PO % | EO % |
| 0 | 2 | 100 | 0 |
| 10 | 4 | 100 | 0 |
| 40 | 18 | 100 | 0 |
| 60 | 27 | 100 | 0 |
| 80 | 36 | 100 | 0 |
| 88 | 40 | 100 | 0 |
| 92 | 42 | 91 | 9 |
| 100 | 46 | 87 | 13 |
| 110 | 51 | 81 | 19 |
| 120 | 56 | 78 | 22 |
| 140 | 65 | 73 | 27 |
| 160 | 73 | 62 | 38 |
| 180 | 81 | 52 | 48 |
| 200 | 88 | 41 | 59 |
| 220 | 94 | 26 | 74 |
| 225 | 95 | 20 | 80 |
| 30 min. digestion | | | |
| 250 | 95 | 0 | 100 |
| 3.4% EO capping | | | |
| 260 | 96 | 0 | 100 |
| 290 | 100 | 0 | 100 |

Various properties of the polyols made in the above Examples are summarized below low in Table IV.

TABLE IV

| Example No. | 1 | 2 | 3 |
|---|---|---|---|
| Solvent | none | none | 1.5 wt. % acetonitrile |
| Polyol | 6k triol | 6k triol | 4k triol |
| OH# (mg KOH/g) | 30 | 30.5 | 28.7 |
| Viscosity (cps) | 1457 | 1995 | 892 |
| Primary OH (mol %) | 55.6 | 64.1 | 74.9 |
| EO (wt. %) | 19.5 | 19.5 | 19.4 |

Examples 4–11

High resilience (HR) slab polyols were made by the process of the present invention as detailed below in Table V.

"Carbowax" is defined as high molecular weight by-product in the ethoxylated polyol. Using gel permeation chromatography ("GPC") analysis of the ethoxylated polyol, carbowax can be identified by the presence of a second peak at molecular weights higher than the molecular weight of the ethoxylated polyol.

TABLE V

| Example No. | 4 | 5 | 6 | 7 | 8 | 9 | 10 | 11 |
|---|---|---|---|---|---|---|---|---|
| Toluene in final polyol (wt. %) | 0.3 | 0 | 0.3 | 0.3 | 0.3 | 0.3 | 0.3 | ACN |
| N-methyl pyrrolidinone (ppm) | 0 | 0 | 0 | 0 | 0 | 480 | 480 | 0 |
| 2-hydroxyethyl pyrrolidinone (ppm) | 0 | 0 | 0 | 480 | 480 | 0 | 0 | 0 |

TABLE V-continued

| Example No. | 4 | 5 | 6 | 7 | 8 | 9 | 10 | 11 |
|---|---|---|---|---|---|---|---|---|
| OH# | 28.2 | 28 | 28.3 | 28.4 | 29.2 | 28 | 28.6 | 29.3 |
| Viscosity (cps) | 1238 | 1546 | 1622 | 1422 | 1358 | 1785 | 1419 | 1819 |
| MW distribution | 1.109 | 1.084 | 1.077 | 1.067 | 1.072 | 1.069 | 1.061 | |
| smooth ramping | yes | yes | yes | yes | yes | yes | yes | yes |
| Mixed Feed digestion | yes | yes | yes | yes | yes | yes | yes | yes |
| 2 wt. % EO capping | no | yes | yes | yes | yes | yes | yes | yes |
| Primary OH | 39.2 | 50.5 | 54.5 | 56.2 | 56 | 57.2 | 59 | 68 |
| EO-OH | 33 | 43 | 49 | 45 | 47 | 54 | 50 | 67 |
| Total EO wt. % | 15.6 | 16 | 13.9 | 15.9 | 15.3 | 15.5 | 16.1 | 19.3 |
| Solid Carbowax | none | none | none | none | none | none | none | none |
| Appearance | hazy | hazy | hazy | hazy | hazy | hazy | hazy | hazy |

ACN = acetonitrile

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A process for preparing a polyoxyalkylene polyol comprising the steps of:
    combining a starter compound having active hydrogen atoms with a double metal cyanide (DMC) catalyst;
    activating the double metal cyanide (DMC) catalyst with a first alkylene oxide monomer ($AO^1$);
    polyoxyalkylating the starter compound with a mixture of the first alkylene oxide monomer ($AO^1$) and a second alkylene oxide monomer ($AO^1/AO^2$) in which the first alkylene oxide monomer ($AO^1$) content of the mixture decreases as content of the second alkylene oxide monomer ($AO^2$) increases over the course of the polyoxyalkylation such that $AO^1+AO^2=100$;
    digesting unreacted monomers of the first alkylene oxide ($AO^1$) and the second alkylene oxide ($AO^2$); and
    capping the polyol by adding the second alkylene oxide ($AO^2$) thereto,
    wherein the first alkylene oxide monomer ($AO^1$) and the second alkylene oxide monomer ($AO^2$) are different.

2. The process according to claim 1, wherein the double metal cyanide (DMC) catalyst comprises zinc hexacyanocobaltate.

3. The process according to claim 1, wherein the first alkylene oxide monomer ($AO^1$) and the second alkylene oxide monomer ($AO^2$) are selected from the group consisting of propylene oxide (PO), ethylene oxide (EO), and butylene oxide.

4. The process according to claim 1, wherein the first alkylene oxide monomer ($AO^1$) is propylene oxide (PO) and the second alkylene oxide monomer ($AO^2$) is ethylene oxide (EO).

5. The process according to claim 1, wherein the starter compound having active hydrogen atoms is selected from the group consisting of polyoxypropylene polyols, polyoxyethylene polyols, polytetatramethylene ether glycols, glycerol, propoxylated glycerols, tripropylene glycol, alkoxylated allylic alcohols, bisphenol A, pentaerythritol, sorbitol, sucrose, degraded starch, water and mixtures thereof.

6. The process according to claim 1, wherein the starter compound having active hydrogen atoms has a number average molecular weight of between about 18 and about 2000.

7. The process according to claim 1, wherein the starter compound having active hydrogen atoms has a number average molecular weight of between about 32 and about 2000.

8. The process according to claim 1, wherein the starter compound having active hydrogen atoms has 1–8 hydroxyl groups.

9. The process according to claim 1, wherein the starter compound having active hydrogen atoms comprises propoxylated propylene glycol.

10. The process according to claim 1, wherein the step of capping adds about 1–5 wt. %, based on the weight of the polyol, of the second alkylene oxide monomer to the polyol.

11. The process according to claim 1, wherein the step of capping adds about 1–3 wt. %, based on the weight of the polyol, of the second alkylene oxide monomer to the polyol.

12. The process according to claim 1, wherein the first alkylene oxide monomer decreases to about 20 wt. % of the mixture as the second alkylene oxide monomer increases to about 80 wt. % of the mixture during the step of polyoxyalkylation.

13. The polyoxyalkylene polyol made by the process according to claim 1.

14. In a process of making one of a polyurethane foam, elastomer, sealant, coating and adhesive, the improvement comprising including the polyoxyalkylene polyol made by the process according to claim 1.

15. A process for preparing a polyoxyalkylene polyol comprising the steps of:
    combining a starter compound having active hydrogen atoms with a double metal cyanide (DMC) catalyst;
    activating the double metal cyanide (DMC) catalyst with propylene oxide monomer (PO);
    polyoxyalkylating the starter compound with a mixture of propylene oxide monomer and ethylene oxide monomer (PO/EO) in which the propylene oxide monomer (PO) content of the mixture decreases as the ethylene oxide monomer (EO) content increases in the mixture over the course of the polyoxyalkylation such that $PO+EO=100$;
    digesting unreacted monomers of propylene oxide (PO) and ethylene oxide (EO); and
    capping the polyol by adding ethylene oxide monomer (EO) thereto.

16. The process according to claim 15, wherein the double metal cyanide (DMC) catalyst comprises zinc hexacyanocobaltate.

17. The process according to claim 15 wherein the starter compound having active hydrogen atoms is selected from the group consisting of polyoxypropylene polyols, polyoxyethylene polyols, polytetatramethylene ether glycols, glycerol, propoxylated glycerols, tripropylene glycol, alkoxylated allylic alcohols, bisphenol A, pentaerythritol, sorbitol, sucrose, degraded starch, water and mixtures thereof.

18. The process according to claim 15, wherein the starter compound having active hydrogen atoms has a number average molecular weight of between about 18 and about 2000.

19. The process according to claim 15, wherein the starter compound having active hydrogen atoms has a number average molecular weight of between about 32 and about 2000.

20. The process according to claim 15, wherein the starter compound having active hydrogen atoms has 1–8 hydroxyl groups.

21. The process according to claim 15, wherein the starter compound having active hydrogen atoms comprises propoxylated propylene glycol.

22. The process according to claim 15, wherein the step of capping adds about 1–5 wt. %, based on the weight of the polyol, of ethylene oxide monomer (EO) to the polyol.

23. The process according to claim 15, wherein the step of capping adds about 1–3 wt. %, based on the weight of the polyol, of ethylene oxide monomer (EO) to the polyol.

24. The process according to claim 15, wherein the propylene oxide monomer (PO) decreases to about 20 wt. % of the mixture as the ethylene oxide monomer (EO) increases to about 80 wt. % of the mixture during the step of polyoxyalkylation.

25. The polyoxyalkylene polyol made by the process according to claim 15.

26. In a process of making one of a polyurethane foam, elastomer, sealant, coating and adhesive, the improvement comprising including the polyoxyalkylene polyol produced by the process according to claim 15.

* * * * *